INVENTORS W. KAMINSKI
H. A. SCHNEIDER
BY [signature]
ATTORNEY

INVENTORS W. KAMINSKI
H. A. SCHNEIDER
BY
ATTORNEY

Aug. 22, 1961 W. KAMINSKI ET AL 2,997,577

SYNCHRONOUS CARRIER PRODUCTION

Filed Jan. 4, 1960 3 Sheets-Sheet 3

INVENTORS W. KAMINSKI
H. A. SCHNEIDER
BY [signature]
ATTORNEY

United States Patent Office 2,997,577
Patented Aug. 22, 1961

2,997,577
SYNCHRONOUS CARRIER PRODUCTION

William Kaminski, West Portal, and Herbert A. Schneider, Millington, N.J., assignors to Bell Telephone Laboratories, Incorporated, New York, N.Y., a corporation of New York Filed Jan. 4, 1960, Ser. No. 230
11 Claims. (Cl. 250—20)

Figure 1:
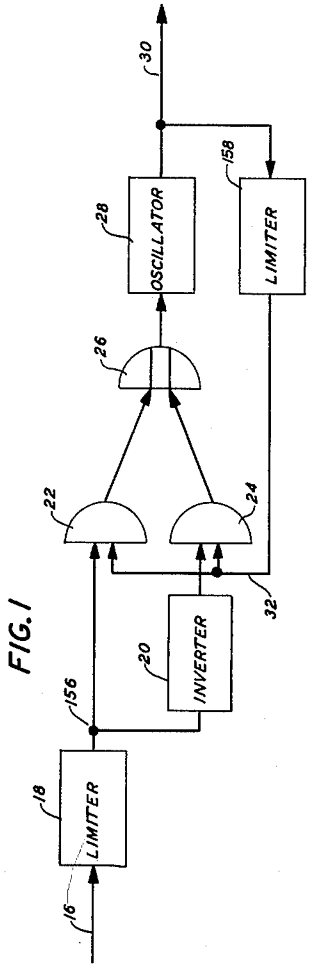

This invention relates to the reception of modulated radio signals and more particularly to the production of synchronous carriers from modulated radio signals which have a degree of modulation exceeding unity for application in demodulation of said signals.

The demodulation of amplitude-modulated signals by conventional methods requires that the signal have a degree of modulation less than unity. The receivers of many communication systems encounter signals which do not meet this requirement for one reason or another. In some instances, for example, the carrier is purposely wholly or partially suppressed at the transmitter. Alternately it is possible that the carrier may undergo more attenuation than the sidebands during transmission due to fading. To demodulate signals with a degree of modulation exceeding unity, augmentation of the signal with additional carrier energy is necessary to render the degree of modulation less than unity. This carrier must be a synchronous carrier, i.e., a sine wave which oscillates at a frequency equal to the frequency located on the frequency-spectrum equidistance between the signal sidebands. The phase relationship between a synchronous carrier and its associated signal sidebands is identical to the phase relationship between the carrier from which the sidebands were originally generated and its associated sidebands.

The problem of producing a synchronous carrier for modulated signals which have a degree of modulation exceeding unity is manifested by the slow development of double-sideband, suppressed-carrier communication systems. Double-sideband, suppressed-carrier signals are merely the extreme case of this class of signals, representing the situation in which the degree of modulation reaches infinity. Originally, the carrier used for the demodulation of modulated signals which have a degree of demodulation exceeding unity was supplied by a source which had no external control of its frequency of oscillation exerted upon it. In this type of system the stability of the carrier sources at both the transmitting and receiving ends of the communication system was of paramount importance and the governing factor or limitation of the performance of the whole system was invariably the frequency stability of these sources.

A recently developed system for the demodulation of modulated signals which have a degree of modulation exceeding unity is shown in J. P. Costas' article in the Proceedings of the I.R.E., December, 1956, commencing at page 1713. In this type of system synchronization of the carrier to the sidebands is obtained with a form of feedback control. Inherent in this system, as in any feedback system, are the design compromises that must be resolved between the closed loop response time and the bandwidth of the system. As the response time of the loop is reduced, the overall system bandwidth expands allowing additional extraneous signal and noise to enter the system. The expanded bandwidth also increases the probability of system instability. The response time-bandwidth problem is generally solved by reducing the response time to the desired value, thereby enlarging the system bandwidth, and designing interference networks, which are characteristic of the specific conditions involved, to cancel out the unwanted signal and noise. As the conditions around which the networks are designed change, the networks must be changed also.

It is, therefore, the object of the present invention to produce a synchronous carrier for the demodulation of modulated signals which have a degree of modulation exceeding unity in a manner which does not necessitate rigid frequency tolerance requirements upon the carrier sources or the bandwidth-response time compromises which are inherent in feedback control systems.

In accordance with the above object, there is provided a system for producing a synchronous carrier from a modulated signal which has a degree of modulation exceeding unity by utilizing the characteristics of the modulated signal together with the appropriate switching circuits. It is characteristic of modulated signals of the type in question to oscillate at a frequency equal to the synchronous carrier frequency, but to undergo a 180 degree phase shift at every zero crossing of the signal envelope. The modulating information is first removed from the signal. Equal portions of the resulting signal are made available to a first input circuit, and to a second input circuit by way of a 180 degree phase shifter. An output circuit is provided together with means for switching the output circuit between the first input circuit and the second input circuit as a source of signals, the switching operation occurring at every phase reversal. In this manner a synchonous carrier, which responds essentially instantaneously to variations in frequency of the modulated signal from which it is produced, is presented to the output circuit. The system bandwidth is independent of this response time.

Figure 4:
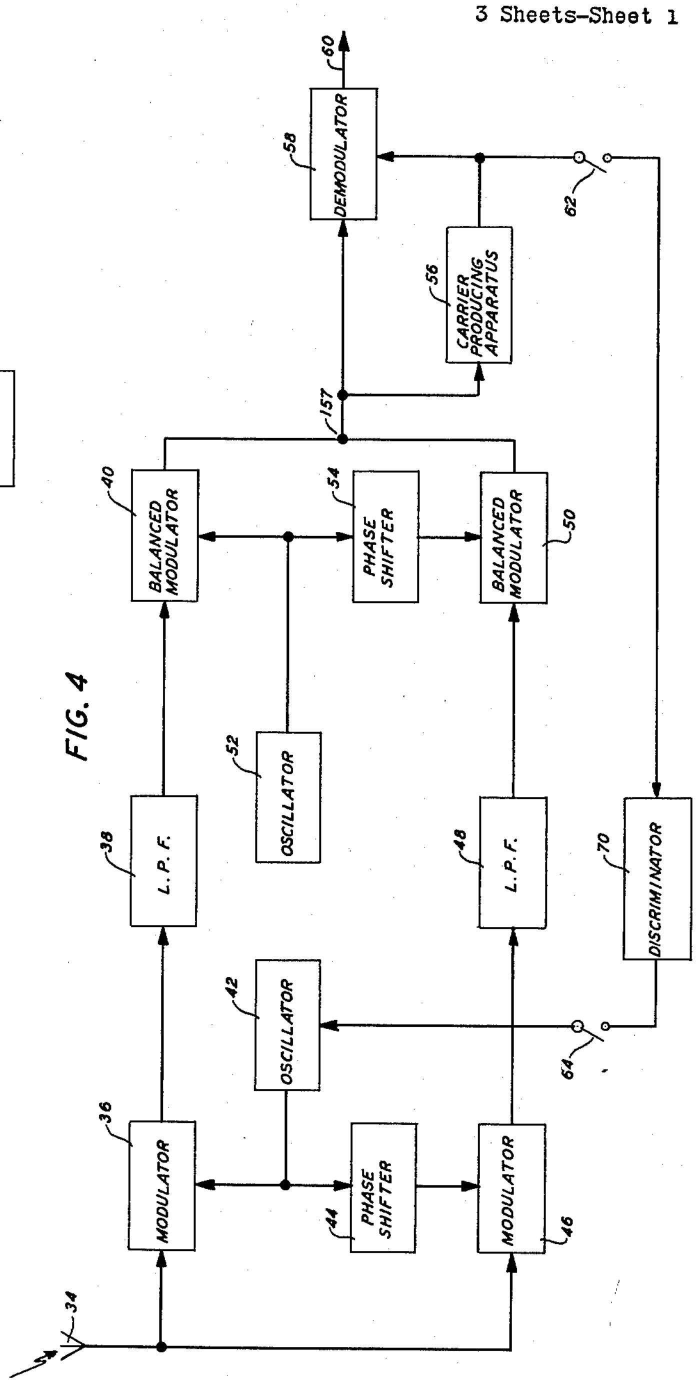
Figure 3:
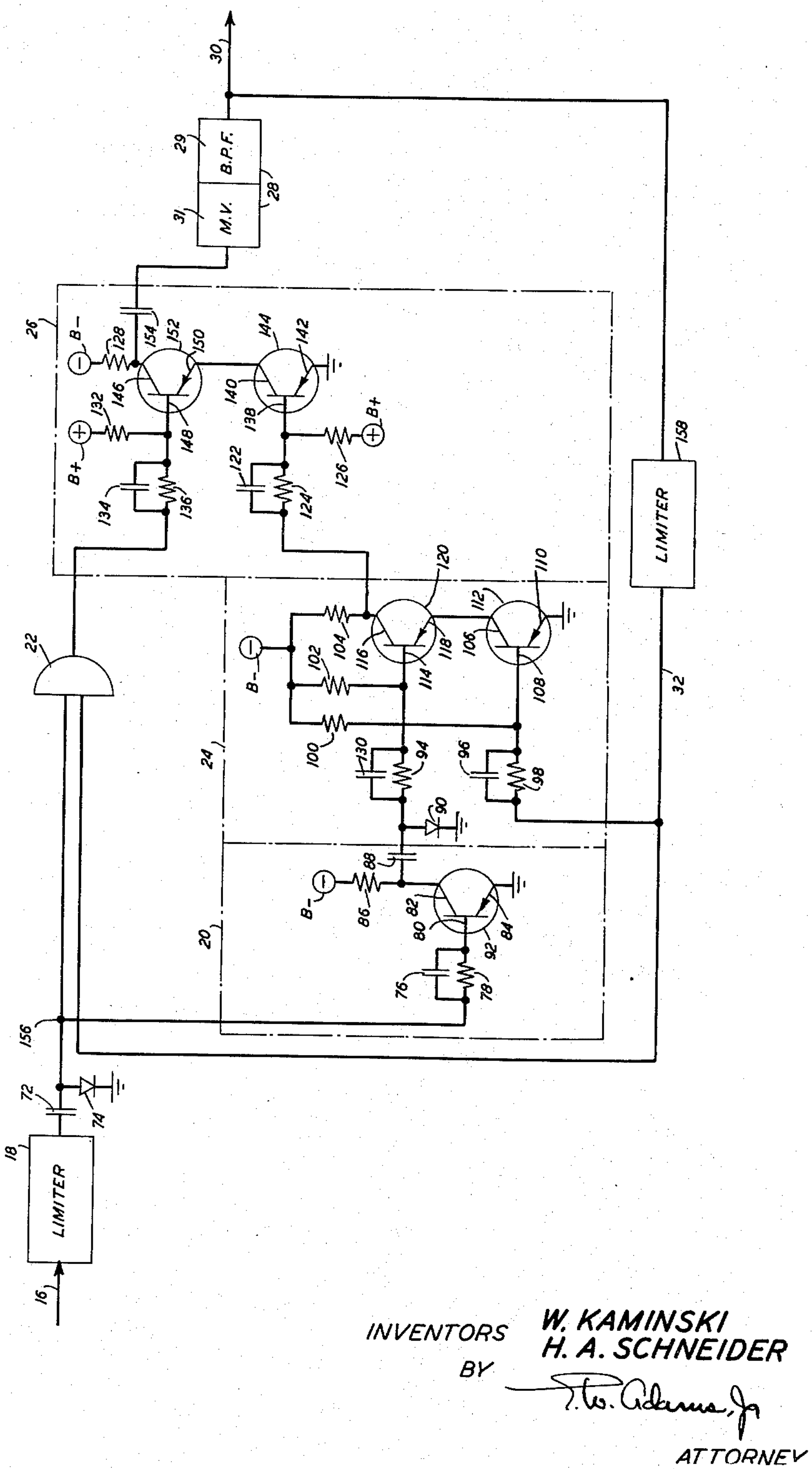

The above and other features of the invention will be considered in detail in the following specification taken in connection with the drawings, in which:

FIG. 1 is a schematic diagram in block form of one embodiment of the synchronous carrier-producing apparatus;

FIGS. 2*a* through 2*e* are representations of typical signal waveforms and will be helpful in the comprehension of the operation of the arrangement of FIG. 1;

FIG. 3 is a schematic diagram of a circuit corresponding to the block diagram of FIG. 1; and FIG. 4 is a schematic diagram in block form of a receiver system utilizing the carrier producing apparatus of FIG. 1.

In accordance with one specific embodiment of the invention, modulated signals which have a degree of modulation exceeding unity are applied to the input of a first limiter circuit. The first limiter output is a pulse train which is identical in frequency and phase to the first limiter input signal. The first limiter output has a common connection with the input of a first AND gate and by way of an inverter, with the input of a second AND gate. With this configuration a pulse applied to the first AND gate is applied to the second AND gate shifted in phase by 180 degrees. When either the first or second AND gate is enabled a pulse is transmitted to an OR gate which in turn passes the pulse. An oscillator, which is susceptible of frequency synchronization, is connected to the output of the OR gate in a manner that effectuates synchronization of the oscillator to the frequency of the OR gate output signal. A portion of the oscillator output signal is fed back concurrently to the input of the first and second AND gates by way of a second limiter circuit which shapes the portion of the fed back oscillator output signal into a pulse train identical in frequency and phase to the oscillator output. Depending on the phase of the fed back pulses with respect to the first limiter output pulses, either the first AND gate or the second AND gate is enabled and disabled at a repetition rate equal to the frequency of the modulated signal between two arbitrarily picked adjacent zero crossings of the signal envelope. The other AND gate remains continuously disabled during this period. The pulses from the AND gate pass through the OR gate and the oscillator becomes synchronized to the frequency of the OR gate output signal. Between the next adjacent zero crossings of the signal envelope, the modulated signal is shifted in phase by 180 degrees with respect to the previous case and, as a result, the phase of the fed back pulses with respect to the first limiter output pulses is such that the roles of the AND gates are interchanged. The AND gate which now actuates the OR gate is enabled and disabled at a repetition rate equal to the frequency of the modulated signal shifted in phase by 180 degrees so that the OR gate output signal, and hence the oscillator output signal, is unaffected by the phase shift of the modulated signal. At each zero crossing of the signal envelope the roles of the AND gates are interchanged in this manner, and the oscillator output remains unaffected by the phase shift of the modulated signal.

Figure 2:
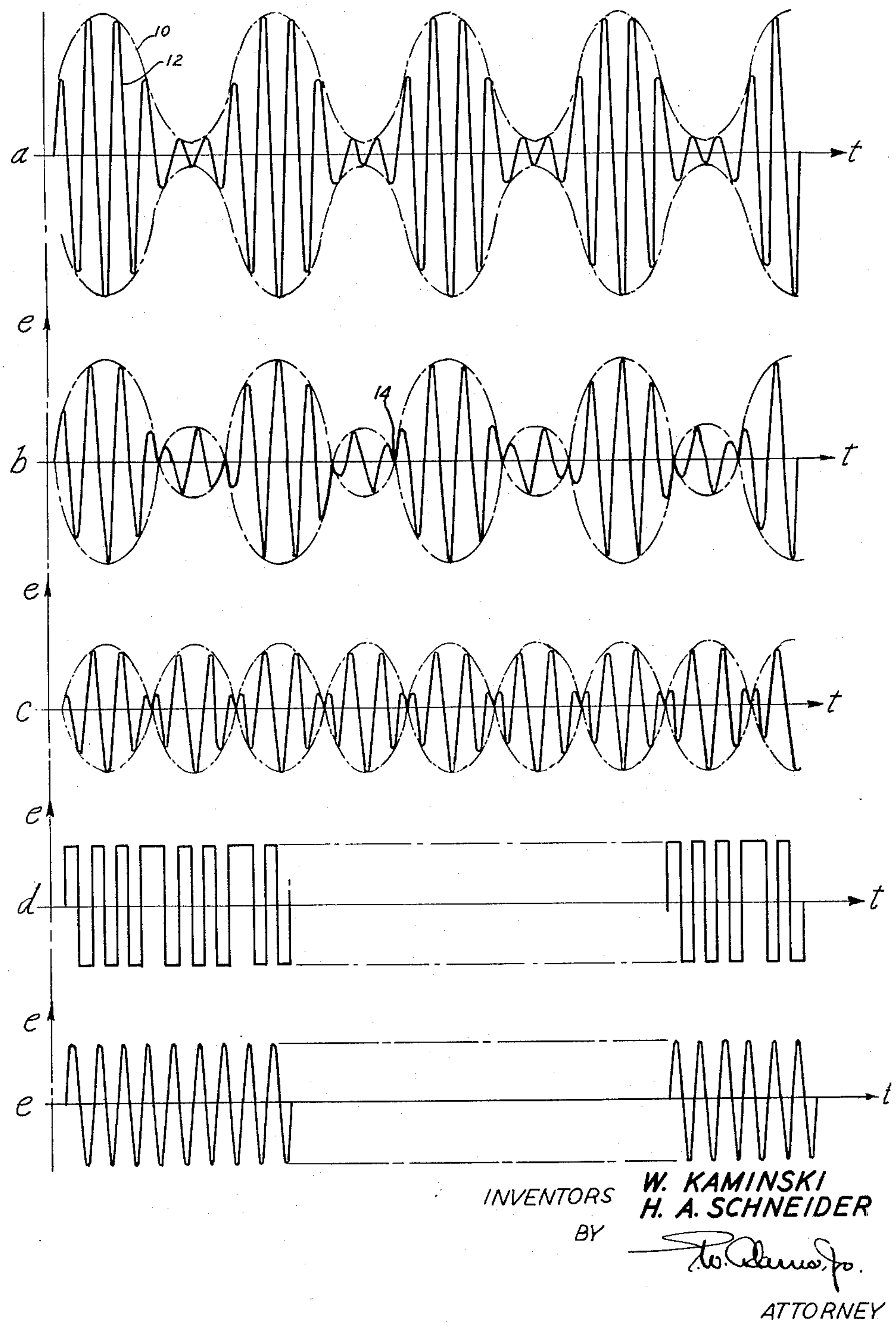

Referring to the drawings, FIG. 2*a* illustrates a modulated sine wave 12. For simplicity of description, the modulating information 10 utilized is of the form $$E_s \sin \omega_s t$$

where $E_s$ is the peak amplitude of the modulating signal, $\omega_s$ is $2\pi$ times the frequency of the modulating signal, and $t$ is time. It should be understood, however, that information of any complex form could be utilized. The expression for the amplitude of the modulated wave 12 with respect to time is $$e=E_c(1+m \sin \omega_s t) \sin \omega_c t \quad (1)$$

where $e$ is the instantaneous amplitude of the modulated signal, $E_c$ is the peak amplitude of the carrier signal, $\omega_c$ is $2\pi$ times the frequency of the carrier signal, and $m$ is the degree of modulation. The degree of modulation, referred to throughout this specification, is the ratio of peak-to-peak amplitude of the modulating signal to the peak-to-peak amplitude of the carrier signal. In terms of the previously defined symbols, $$m=\frac{E_s}{E_c}$$

FIG. 2*b* is a representation of the amplitude of a modulated signal with respect to time for the special case in which the degree of modulation exceeds unity. As can be observed from FIG. 2*b*, the modulated signal undergoes a 180 degree phase shift at each zero crossing (such as that at 14) of the envelope. This is confirmed by Equation 1. For values of $m$ in Equation 1 larger than unity, there are intervals of time in which the expression $$1+m \sin \omega_s t$$

becomes negative in value. The change in sign of the amplitude of the modulated signal from positive to negative is tantamount to a 180 degree phase shift of the waveform of this signal.

A double-sideband, suppressed-carrier signal is merely an extreme case of the type of signal shown in FIG. 2*b*. In the case of the double-sideband, suppressed-carrier signal, the degree of modulation reaches infinity and Equation 1 reduces to $$e=E_s \sin \omega_s t \sin \omega_c t \quad (2)$$

The plot of the amplitude of this signal with respect to time is indicated in FIG. 2*c*.

It can be seen by subjecting either the waveforms of FIGS. 2*b* or 2*c* to a limiter circuit that a waveform similar to FIG. 2*d* results. By performing the proper switching and filtering operations upon the waveform of FIG. 2*d*, the waveform of FIG. 2*e*, a synchronous carrier, is obtained.

A preferred embodiment of the synchronous carrier-producing apparatus is disclosed as shown in FIG. 1 in block diagram form. Modulated signals whose degree of modulation exceed unity, as represented by the waveforms of FIG. 2*b* or FIG. 2*c*, are presented to a limiter 18 over an input lead 16. Limiter 18 may be any conventional circuit of the type commonly used for clipping or limiting signals. The output of limiter 18 is of the form shown in FIG. 2*d*. This signal is shaped and fed concurrently from a junction point 156 to the first input of an AND gate 22 and an inverter 20. The output of inverter 20 is connected to the first input of an AND gate 24 so that the signal presented to AND gate 22 is presented to AND gate 24 shifted in phase by 180 degrees. The outputs from AND gates 22 and 24 are connected by way of an OR gate 26 to an oscillator 28 which is synchronized to the pulses appearing at the output of OR gate 26. A feedback circuit 32 applies a sample of the output of oscillator 28 to the second inputs of AND gates 22 and 24 by way of a limiter 158, which may be the same type as limiter 18. If the output signal from limiter 18 present at a junction point 156 is in synchronism with the signal from the output of oscillator 28 present on feedback circuit 32, AND gate 22 and OR gate 26 will both pass the combined signal. If the signal present at junction point 156 is 180 degrees out of a synchronism with the signal present on feedback circuit 32, AND gate 22 remains off and instead AND gate 24 and OR gate 26 will both pass the combined signal. The output of OR gate 26, therefore, remains essentially constant in frequency despite the zero crossings of the modulated signal on lead 16 which manifest themselves as 180 degree phase shifts at junction point 156. The synchronous carrier (the output signal of oscillator 28) is then available at an output circuit 30.

Oscillator 28 may be any oscillator which is susceptible of synchronization to the frequency of repetition of external pulses, together with the apparatus which may be required to cooperate with the oscillator to bring about synchronization. If a relaxation-type oscillator (an astable multivibrator, for example,) is utilized, no additional apparatus is necessary to effect synchronization. A bandpass or low-pass filter may be used in the output circuit to reject all but the fundamental frequency component. On the other hand, if a sinusoidal-type oscillator is used, it may be desired to accomplish synchronization with the aid of a phase-comparator circuit and a reactance-control element located in the oscillator. The synchronizing pulses are continuously compared in phase with the oscillator output and a control signal developed which is fed to the phase-control element of the oscillator as error correction.

FIG. 3 discloses a detailed circuit which is exemplary of the block diagram of FIG. 1. Here signals from a source of modulated signals whose degree of modulation exceeds unity are presented over input lead 16 to limiter 18. A coupling capacitor 72 connects the output of limiter 18 to junction point 156 which is connected by way of a diode 74 in the direction of easy conduction to ground. Diode 74 and capacitor 72 shape the output of limiter 18 into a train of negative pulses suitable for application to and compatible with the particular inverter 20 and AND gate 22 employed in FIG. 3. Junction point 156 is connected to the input of AND gate 22 and to one terminal of the parallel combination of a resistor 78 and bypass capacitor 76 which constitutes the input of inverter 20. Transistor 92 having an emitter 84, a collector 82 and a base terminal 80, comprises inverter 20. Base terminal 80 is connected to the other terminal of the parallel combination of resistor 78 and capacitor 76. Emitter 84 is connected to ground and collector 82 is connected through a bias resistor 86 to a source of negative potential denoted as B—. A coupling capacitor 88 connects collector 82 of inverter 20 to a diode 90, which is connected in the direction of easy conduction to ground.

AND gate 24 comprises transistors 120 and 112 and associated circuits. An input connection is made from collector 82 of transistor 92 through coupling capacitor 88 and the parallel combination of a resistor 94 and bypass capacitor 130 to the base 114 of transistor 120. Base 114 and collector 116 of transistor 120 are connected by way of bias resistors 102 and 104, respectively, to a source of negative potential indicated as B—. In a similar fashion a second input is provided to AND gate 24 from feedback circuit 32 by way of the parallel combination of a resistor 98 and bypass capacitor 96 to the base 108 of transistor 112. Base 108 is connected by way of a bias resistor 100 to B—. The emitter 110 and collector 106 of transistor 112 are connected respectively to ground and to the emitter 118 of transistor 120 Most conveniently, AND gate 22 is identical in all respects to AND gate 24; but with the appropriate design any circuit which functions as an AND gate could be utilized for AND gate 22.

OR gate 26 comprises transistors 144 and 152 and associated circuits. An input connection is made from collector 116 of transistor 120 in AND gate 24 to the base 138 of transistor 144 by way of the parallel combination of a capacitor 122 and resistor 124. The base of transistor 144 is connected to a source of positive potential, denoted as B+ by way of a bias resistor 126. In a similar fashion the base circuit of transistor 152 includes a base 148 connected to a positive potential B+ through a bias resistor 132 and an input connection from AND gate 22 through the parallel connected capacitor 134 and resistor 136. The emitter 142 of transistor 144 is grounded and the collector 140 is connected directly to the emitter 150 of transistor 152. The collector 146 of transistor 152 is connected through resistor 128 to B—, and through capacitor 154 to the synchronizing element of oscillator 28.

In particular, oscillator 28 comprises an astable multivibrator 31 with a bandpass filter 29, tuned to reject all but the fundamental component of the multivibrator output, interposed between the multivibrator output and output circuit 30. A sample of the signal appearing at output circuit 30 is shaped by limiter 158 for application to AND gates 22 and 24 by way of feedback circuit 32.

FIG. 4 illustrates a receiver system for demodulating modulated signals which have a degree of modulation exceeding unity utilizing the apparatus of FIG. 1. The modulated input signal from input means 34 is first translated to an intermediate frequency to facilitate filtering and synchronous carrier production. To this end it is split into two equal parts, which are sent to a modulator 36 and a modulator 46, respectively. A local oscillator 42 generates a carrier, a portion of which is beat with the first part of the modulated input signal in modulator 36. A low-pass filter 38 is designed to pass only the lower sidebands of the output from modulator 36. Since the local oscillator carrier differs in frequency from the synchronous carrier of the modulated input signal applied to modulator 36 there are two sidebands present in the low frequency output of filter 38. The first sideband is located at a position on the frequency spectrum which is greater than its unmodulated position by an amount equal to the frequency deviation of local oscillator 42 from the synchronous carrier of the modulated input signal. The second sideband is located at a position which is less than its unmodulated position by an amount equal to the same frequency deviation. The first and second sidebands are modulated by a portion of the output from a local oscillator 52, oscillating at an intermediate frequency. Four sidebands result which which are centered about a point which is greater or less than the frequency of local oscillator 52 by the frequency deviation of local oscillator 42 from the synchronous carrier of the modulated input signal.

Similarly, the second part of the input signal is modulated by a portion of the carrier from local oscillator 42 which is shifted in phase by 90 degrees by a phase shifter 44. Assuming identical modulators 36 and 46, identical filters 38 and 48, and no attenuation through phase shifter 44, the sidebands present at the output of low-pass filter 48 are identical to those at filter 48 except for a 90 degree phase difference. The sidebands from filter 48 are modulated in a balanced modulator 50 by a portion of the output from oscillator 52 which is shifted in phase by 90 degrees by a phase shifter 54. Of the four sidebands produced in balanced modulator 50, two are advanced in phase by 90 degrees and two are retarded in phase by 90 degrees. As a result, with respect to the four sidebands produced in balanced modulator 40, two of the sidebands are in phase and two of the sidebands are 180 degrees out of phase. Assuming identical balanced modulators 40 and 50 and no attenuation through phase shifter 54, when the two balanced modulator outputs are combined at a junction point 157, two of the sidebands cancel out and what remains is the original modulated input sidebands translated to an intermediate frequency range. As pointed out previously, the translated sidebands are centered about a frequency which differs from the frequency of local oscillator 52 by the frequency deviation of local oscillator 42 from the synchronous carrier of the modulated input signal.

A sample of the translated signal is extracted and applied to the carrier producing apparatus 56. The resultant synchronous carrier is combined with the translated signal in a demodulator 58, the combined wave is demodulated, and the transmitted information is extracted from an output lead 60.

As a modification of the above system, a slow-acting, automatic-frequency control loop may be utilized without increasing the bandwidth of the receiver system. The modified system has the advantages of allowing greater frequency tolerance of local oscillator 42 and tighter filtering than the aforementioned system. By closing switches 62 and 64 the automatic frequency control loop is formed. As noted previously, the synchronous carrier of the translated signal deviates in frequency from local oscillator 52 by the same amount that the synchronous carrier of the modulated input signal deviates from local oscillator 42. By presenting a portion of the synchronous carrier developed by carrier producing apparatus 56 by way of switch 62 to a frequency discriminator 70, which is adjusted to produce zero output when a signal of the frequency of oscillator 52 is applied to the input, a direct-current signal is developed. This direct current signal is indicative in magnitude and polarity of the frequency deviation between the synchronous carrier and the output from oscillator 52, and is suitable for use as error correction of oscillator 42. To this end the direct-current output of discriminator 70 is applied through switch 64 to the control element of oscillator 42. In this embodiment of the invention oscillator 42 must obviously be some oscillator amenable to frequency control.

What is claimed is:

1. In a system for producing synchronous carriers from modulated electrical signals which have a degree of modulation exceeding unity, a source of said modulated signals, means for abstracting a portion of said signal from said source, means for obtaining from said portion a signal which is representative of said synchronous carrier but which undergoes a 180 degree phase shift at every zero crossing of the envelope of said modulated signal, a 180 degree phase-shifting device, means for channeling a portion of said carrier-representative signal through said phase-shifting device, means for detecting the occurrence of said zero crossings, an output circuit, and means actuated by said detection means upon each of said occurrences for switching the signal applied to said output circuit between said carrier-representative signal and said carrier-representative signal shifted in phase by 180 degrees to obtain a synchronous carrier at said output circuit.

2. In a system for producing synchronous carriers from modulated electrical signals which have a degree of modulation exceeding unity, a source of said modulated signals, means for abstracting a portion of said signal from said source, means for limiting the amplitude of said portion, a source of oscillatory electrical energy, means for synchronizing the frequency of said energy from said oscillatory source to the frequency of said limited portion when said energy from said oscillatory source is in phase with said signal, means for synchronizing the frequency of the energy from said oscillatory source to the frequency of said limited portion shifted in phase by 180 degrees when said energy from said oscillatory source is 180 degrees out of phase with said signal, an output circuit, and means for applying the synchronized energy from said source to said output circuit.

3. In a system for producing synchronous carriers from modulated electrical signals which have a degree of modulation exceeding unity, a source of said modulated signals, means for abstracting a portion of said signal, means for limiting the amplitude of said portion, a multivibrator, means for synchronizing the frequency of oscillation of said multivibrator to the frequency of said limited portion when said multivibrator signal is in phase with said modulated signal, means for synchronizing the frequency of oscillation of said multivibrator to the frequency of said limited portion shifted in phase by 180 degrees when said multivibrator signal is 180 degrees out of phase with said modulated signal, and means for extracting the synchronous carrier from said multivibrator.

4. In a system for producing synchronous carriers from modulated electrical signals which have a degree of modulation exceeding unity, a source of said modulated signals, a first limiter, means for applying a portion of said modulated signal from said source to said first limiter, an inverter, a first AND gate, means for applying the output of said first limiter concurrently to said first AND gate and to said inverter, a second AND gate, means for applying the signal from the output of said inverter to said second AND gate, an OR gate, means for applying the signal from the output of said first AND gate and the signal from the output of said second AND gate to the input of said OR gate, a source of oscillatory electrical energy, means for synchronizing the frequency of oscillation of said source to the frequency of oscillation of the signals from the output of said OR gate, means for abstracting a sample of the signal from said source, a second limiter, means for applying said sample to said second limiter, means for applying the output from said second limiter concurrently to said first AND gate and to said second AND gate, an output circuit, and means for applying said synchronous carrier from said source to said output circuit.

5. In a system for producing a synchronous carrier from modulated electrical signals which have a degree of modulation exceeding unity, a source of said modulated signals, a first limiter, means for applying a portion of said modulated signal from said source to said first limiter, an inverter, a first AND gate, means for applying the output of said first limiter concurrently to said first AND gate and to said inverter, a second AND gate, means for applying the signal from the output of said inverter to said second AND gate, an OR gate, means for applying the signal from the output of said first AND gate and the signal from the output of said second AND gate to the input of said OR gate, a multivibrator with a filter connected to the output thereof in order to pass only the fundamental frequency component of the multivibrator output signal, means for synchronizing the frequency of oscillation of said multivibrator to the frequency of oscillation of the signals from the output of said OR gate, means for abstracting a sample of the signal from the output of said filter, a second limiter, means for applying said sample to said second limiter, means for applying the output from said second limiter concurrently to said first AND gate and to said second AND gate, an output circuit, and means for applying said synchronous carrier from said source to said output circuit.

6. In a system for the reception of modulated electrical signals which have a degree of modulation exceeding unity, a source of said modulated signals, an input circuit, means for applying said signal to said input circuit, means for abstracting a portion of said signal from said source, means for obtaining from said portion a signal which is representative of the synchronous carrier but which undergoes a 180 degree phase shift at every zero crossing of the envelope of said modulated signal, a 180 degree phase-shifting device, means for channeling a portion of said carrier-representative signal through said phase-shifting device, means for detecting the occurrence of said zero crossings, an output circuit, means actuated by said detection means upon each of said occurrences for switching the signal applied to said output circuit between said carrier-representative signal and said carrier-representative signal shifted in phase by 180 degrees to obtain a synchronous carrier at said output, means for combining said synchronous carrier and said modulated signal, means for demodulating the combined wave to obtain the transmitted information.

7. In a system for the reception of modulated electrical signals which have a degree of modulation exceeding unity, a source of said modulated signals, an input circuit, means for applying said signal to said input circuit, means for abstracting a portion of said signal, means for limiting the amplitude of said portion, a source of oscillatory electrical energy, means for synchronizing the frequency of said energy from said oscillatory source to the frequency of said limited portion when said energy from said oscillatory source is in phase with said signal, means for synchronizing the frequency of the energy from said oscillatory source to the frequency of said limited portion shifted in phase by 180 degrees when said energy from said oscillatory source is 180 degrees out of phase with said signal, an output circuit, means for applying the synchronized energy from said source to said output circuit, and means for combining said synchronized energy and said signal, and means for demodulating the combined wave to obtain the transmitted information.

8. In a system for the reception of modulated electrical signals which have a degree of modulation exceeding unity, a source of said modulated signals, an input circuit, means for applying said signal to said input circuit, means for translating said signal to an intermediate frequency range, and means for producing a synchronous carrier from said translated signal comprising means for abstracting a portion of said translated signal, means for obtaining from said portion a signal which is representative of said synchronous carrier but which undergoes a 180 degree phase shift at every zero crossing of the envelope of said translated signal, a 180 degree phase-shifting device, means for channeling a portion of said carrier-representative signal through said phase-shifting device, means for detecting the occurrence of said zero crossings, an output circuit, and means actuated by said detection means upon each of said occurrences for switching the signal applied to said output circuit between said carrier-representative signal and said carrier-representative signal shifted in phase by 180 degrees to obtain a synchronous carrier at said output circuit.

9. In a system for the reception of modulated electrical signals which have a degree of modulation exceeding unity, a source of said modulated signals, an input circuit, means for applying said signal to said input circuit, means for translating said signal to an intermediate frequency range, means for producing a synchronous carrier from said translated signal comprising means for abstracting a portion of said translated signal, means for obtaining from said portion a signal which is representative of said synchronous carrier but which undergoes a 180 degree phase shift at every zero crossing of the envelope of said translated signal, a 180 degree phase shifting device, means for channeling a portion of said carrier-representative signal through said phase-shifting device, means for detecting the occurrence of said zero crossings, an output circuit, means actuated by said detection means upon each of said occurrences for switching the signal applied to said output circuit between said carrier-representative signal and said carrier-representative signal shifted in phase by 180 degrees to obtain a synchronous carrier at said output circuit, means for combining said synchronous carrier and said translated signal, and means for demodulating the combined wave to obtain the transmitted information.

10. In a system for the reception of modulated signals, a source of said modulated signals, an input circuit, means for applying said signal to said input circuit, means for translating said signal to an intermediate frequency range comprising means for splitting said signal into two parts, a first branch circuit, a second branch circuit, a first local oscillator, means for developing a first and a second output from said first local oscillator in phase quadrature with each other, means for combining said first part with said first output from said first local oscillator in said first branch circuit, means for combining said second part with said second output from said first local oscillator in said second branch circuit, means for demodulating the combined wave in said first branch circuit, means for demodulating the combined wave in said second branch circuit, a first balanced modulator, a second balanced modulator, a second local oscillator, means for developing a first and a second output from said second local oscillator in phase quadrature with each other, means for modulating said first output from said second local oscillator with the demodulated signal in said first branch circuit in said first balanced modulator, means for modulating said second output from said second local oscillator with the demodulated signal in said second branch circuit in said second balanced modulator, and means for combining said first balanced modulator output and said second balanced modulator output to obtain a modulated signal centered about a frequency in the proximity of the frequency of said second local oscillator, means for producing a synchronous carrier from said translated signal, means for developing a signal which is indicative in amplitude and polarity of the discrepancy in frequency between said first local oscillator output and said modulated signal applied to said input circuit, and means for applying said indication signal to said first local oscillator for correction of the frequency of oscillation thereof.

11. In a system for the reception of modulated signals, a source of said modulated signals, an input circuit, means for applying said signal to said input circuit, means for translating said signal to an intermediate frequency range comprising means for splitting said signal into two parts, a first branch circuit, a second branch circuit, a first local oscillator, means for developing a first and a second output from said first local oscillator in phase quadrature with each other, means for combining said first part with said first output from said first local oscillator in said first branch circuit, means for combining said second part with said second output from said first local oscillator in said second branch circuit, means for demodulating the combined wave in said first branch circuit, means for demodulating the combined wave in said second branch circuit, a first balanced modulator, a second balanced modulator, a second local oscillator, means for developing a first and a second output from said second local oscillator in phase quadrature with each other, means for modulating said first output from said second local oscillator with the demodulated signal in said first branch circuit in said first balanced modulator, means for modulating said second output from said second local oscillator with the demodulated signal in said second branch circuit in said second balanced modulator, and means for combining said first balanced modulator output and said second balanced modulator output to obtain a modulated signal centered about a frequency in the proximity of the frequency of said second local oscillator, means for producing a synchronous carrier from said translated signal, means for abstracting a sample of said synchronous carrier, a frequency discriminator, means for developing a signal from said discriminator which is indicative in amplitude and polarity of the error in frequency of said first local oscillator output, means for applying said signal from said discriminator to said first local oscillator for correction of the frequency of oscillation thereof, means for combining said synchronous carrier and said translated signal, and means for demodulating the combined wave to obtain the transmitted information.

References Cited in the file of this patent

UNITED STATES PATENTS 2,784,311 Kahn ---------------- Mar. 5, 1957